(12) United States Patent
Chang

(10) Patent No.: US 7,849,410 B2
(45) Date of Patent: Dec. 7, 2010

(54) POINTING-CONTROL SYSTEM FOR MULTIPOINT CONFERENCES

(75) Inventor: Kuo-Lung Chang, Junghe (TW)

(73) Assignee: Awind Inc., Taipei County (TW)

( * ) Notice: Subject to any disclaimer, the term of this patent is extended or adjusted under 35 U.S.C. 154(b) by 796 days.

(21) Appl. No.: 11/744,843

(22) Filed: May 5, 2007

(65) Prior Publication Data
US 2008/0209346 A1    Aug. 28, 2008

(30) Foreign Application Priority Data
Feb. 27, 2007    (TW) .................................. 96106592

(51) Int. Cl.
*G06F 3/048* (2006.01)
(52) U.S. Cl. ........................ 715/754; 715/751; 715/753; 715/759; 715/856; 715/859; 715/861
(58) Field of Classification Search ................. 715/754, 715/759
See application file for complete search history.

(56) References Cited

U.S. PATENT DOCUMENTS

| | | | | |
|---|---|---|---|---|
| 5,748,189 A | * | 5/1998 | Trueblood | 715/755 |
| 5,796,396 A | * | 8/1998 | Rich | 715/741 |
| 5,900,869 A | * | 5/1999 | Higashio | 715/751 |
| 6,072,463 A | * | 6/2000 | Glaser | 715/753 |
| 6,614,451 B1 | * | 9/2003 | Hudson et al. | 715/759 |
| 7,365,738 B2 | * | 4/2008 | Molander et al. | 345/157 |
| 7,430,721 B2 | * | 9/2008 | Johanson et al. | 715/761 |
| 7,464,338 B2 | * | 12/2008 | Sato | 715/750 |
| 2002/0026478 A1 | * | 2/2002 | Rodgers et al. | 709/205 |
| 2002/0063740 A1 | * | 5/2002 | Forlenza et al. | 345/856 |

* cited by examiner

*Primary Examiner*—Alvin H Tan
(74) *Attorney, Agent, or Firm*—Ming Chow; Sinorica, LLC

(57) ABSTRACT

A pointing-control system for multipoint conferences includes a plurality of computers, a gateway, a display, a conference-control module and a pointing-control module. The computers are connected through a wired or wireless network with the gateway. The computer with the highest priority number is defined as the host computer having the right to assign any of the computers to be the report computer. The conference-control module can demonstrate a presentation frame of the report computer on the display through the gateway. The pointing-control module is used to capture pointing coordinates of pointing apparatuses of the respective computers, and further to display the pointing coordinates on the presentation frame of the display.

9 Claims, 7 Drawing Sheets

| User name | Jack | ▼ |
|---|---|---|
| color | Red | ▼ |
| shape | circle | ▼ |
| status | enable | ▼ |

POINTING-CONTROL SYSTEM FOR MULTIPOINT CONFERENCES

BACKGROUND OF THE INVENTION (1) Field of the Invention

The invention relates to a multipoint conference among plural participants, and more particularly to a pointing-control system used for collaborating such a multipoint conference.

(2) Description of the Prior Art

Thanks to the improvement in computer and networking technology that the multipoint conference becomes one of the most popular conferencing means for the participants communicating opinions and messages each other.

Referring to FIG. 1A and FIG. 1B, a framework of a multipoint conference and a block diagram of a pointing-control system for the multipoint conference are shown, respectively. The multipoint conference includes a plurality of computers 1 (participants), a gateway 2, a display 3 and a conference-control module 4. Each of the computers has a conference-control module 4 and a pointing apparatus 6.

Every of the computers 1 has networking capability, either wired or wireless, and can establish network connection to gateway 2. The display 3 can be a liquid crystal display, a plasma display TV, or a digital projector, any of which has a DVI or a VGA interface. In the figures, a typical digital projector having a screen is used as an example. When the digital projector establishes a connection with the gateway 2, the projector can project a presentation frame transmitted from the gateway 2 onto the screen. Generally, the multipoint conference can only be taken place through the conference-control module 4.

The conference-control module 4 is an application program to make the multipoint conference possible. In the art, the gateway 2 for multipoint conferences usually includes a built-in conference-control module 4, and thereby the computer 1 to join the multipoint conference can download the conference-control module 4 through the gateway 2. Then, the conference-control module 4 can be executed in the computer 1 so as to have the user of the computer 1 join the multipoint conference.

When a multipoint conference begins, the conference-control module 4 would define the participant (computer) having the highest priority number to be the host computer 1a. The host computer 1a has the right to assign any of the computers 1 to be the report computer 1b. The conference-control module 4 would transmit the presentation frame 5 of the report computer 1b to the gateway 2 and further to show the presentation frame 5 on the display 3. At this current time, the report computer 1b takes the mission to report his/her presentation frame 5 to all the other participants (computers 1) of the multipoint conference.

It is easy to see that the aforesaid multipoint conference has the advantage in that a computer 1 can be the report computer 1b anytime only through the recognition of the host computer 1a. Then, he/she can demonstrate his/her materials on the display 3 through the gateway 2.

However, in the aforesaid multipoint conference, the display 3 can only display the presentation frame 5 transmitted from the report computer 1b and a symbol of the pointing apparatus 6b (a mouse cursor for example) of the report computer 1b. Any discussion from the other participants can only be noticed through oral expressions or a laser point projected on the display 3. Obviously, the oral expressions are hardly to be quickly related to a specific point in the presentation frame 5. Also, the laser point generated by a laser pointer prepared by individual participant is usually monochromatic (red for example). Thus, in a discussion situation involving more than two participants, plural laser points on the display 3 would be quite possible to make the discussion chaotic.

SUMMARY OF THE INVENTION

Accordingly, it is an object of the present invention to provide a pointing-control system for multipoint conferences, in which the system can simultaneously display pointing coordinates of respective pointing apparatuses of the corresponding computers on the display, and such that the discussion of the multipoint conference can be much productive.

In the present invention, the pointing-control system for multipoint conferences comprises a plurality of computers (participants), a gateway, a display, a conference-control module and a pointing-control module.

Every of the computers of the present invention has a pointing apparatus (a mouse device for example), and the pointing apparatus can generate a respective pointing coordinate (a cursor for example) on the presentation frame shown on the screen of the respective computer. Further, any computer of the present invention can connect to its local network (wired or wireless) for transmitting data to the gateway. As soon as the display is connected with the gateway (through cables such as VGA), data transmitted from the participant computer through the gateway can be displayed on the display.

The conference-control module can be stored in the gateway, and can be downloaded to the computer that is connected with the gateway. After all of the computers to join the multipoint conference have downloaded and further executed the conference-control module, the multipoint conference of the present invention can be taken place anytime. In the present invention, every computer is assigned by a predetermined priority number. Determined by the conference-control module, the computer having the highest priority number is defined as a host computer capable of assigning any computer as a report computer. Then, a presentation frame of the report computer can be demonstrated on the display through the gateway.

In the present invention, a pointing-control module can be stored inside the gateway and can be downloaded to the computer when an network connection is established in between with the gateway. The pointing-control module and the conference-control module can be integrated as a unique module, or can be two independent modules. The pointing-control module is mainly used to capture the pointing coordinates of the pointing apparatuses of the respective computers, and further to display the pointing coordinates on the presentation frame of the display in an on-screen-display (OSD) means.

In the present invention, when a computer is connected with the gateway, the pointing-control module would automatically generate an input interface on the screen of the computer for the user to input a user name, a color of the pointing coordinate, a configuration, and a start/terminate command to the pointing-control module. In the case that the user starts the pointing-control module, the user name, the color of the pointing coordinate and the configuration would be displayed/inserted on the presentation frame shown on the display, according to user's instructions. On the other hand, in the case that the user terminates the pointing-control module, the pointing coordinate of the user would disappear from the presentation frame on the display.

In one embodiment of the present invention, the pointing-control module can further include a resolution-converting module for compensating a resolution difference between the screen of the computer and the screen of the display so as to have the respective pointing coordinate of the pointing apparatus of the computer displayed on the presentation frame of the display correctly (i.e. on the expected positions of the presentation frame).

In one embodiment of the present invention, the pointing-control module can further include a sketch mode-switch module. A hot key of the computer is used to switch the sketch mode-switch module. When the sketch mode-switch module is activated, the pointing-control module would display tracks of the pointing apparatus of the respective computer to the presentation frame of the display. When the sketch mode-switch module is terminated, the sketch function of the pointing apparatus on the presentation frame of the display would be disabled.

In one embodiment of the present invention, the pointing-control module can further include a monitor module for monitoring states of the pointing apparatuses of the computers. In the case that any of the pointing apparatuses is idle for a predetermined time, the monitor module would suspend the idle pointing apparatus in transmitting the pointing coordinate to the presentation frame of the display, till the idle pointing apparatus is reactivated.

By providing the pointing-control system to perform the multipoint conference, any of the computers can issue his/her opinions upon the on-play presentation frame through the respective pointing apparatus (the mouse device for example) and the respective pointing coordinate (the cursor for example), and thereby other participants of the multipoint conference can clearly understand the discussion issue. Upon such an arrangement, the multipoint conference can be held much smoothly.

All these objects are achieved by the pointing-control system for multipoint conferences described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a pointing-control system for multipoint conferences. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1A:
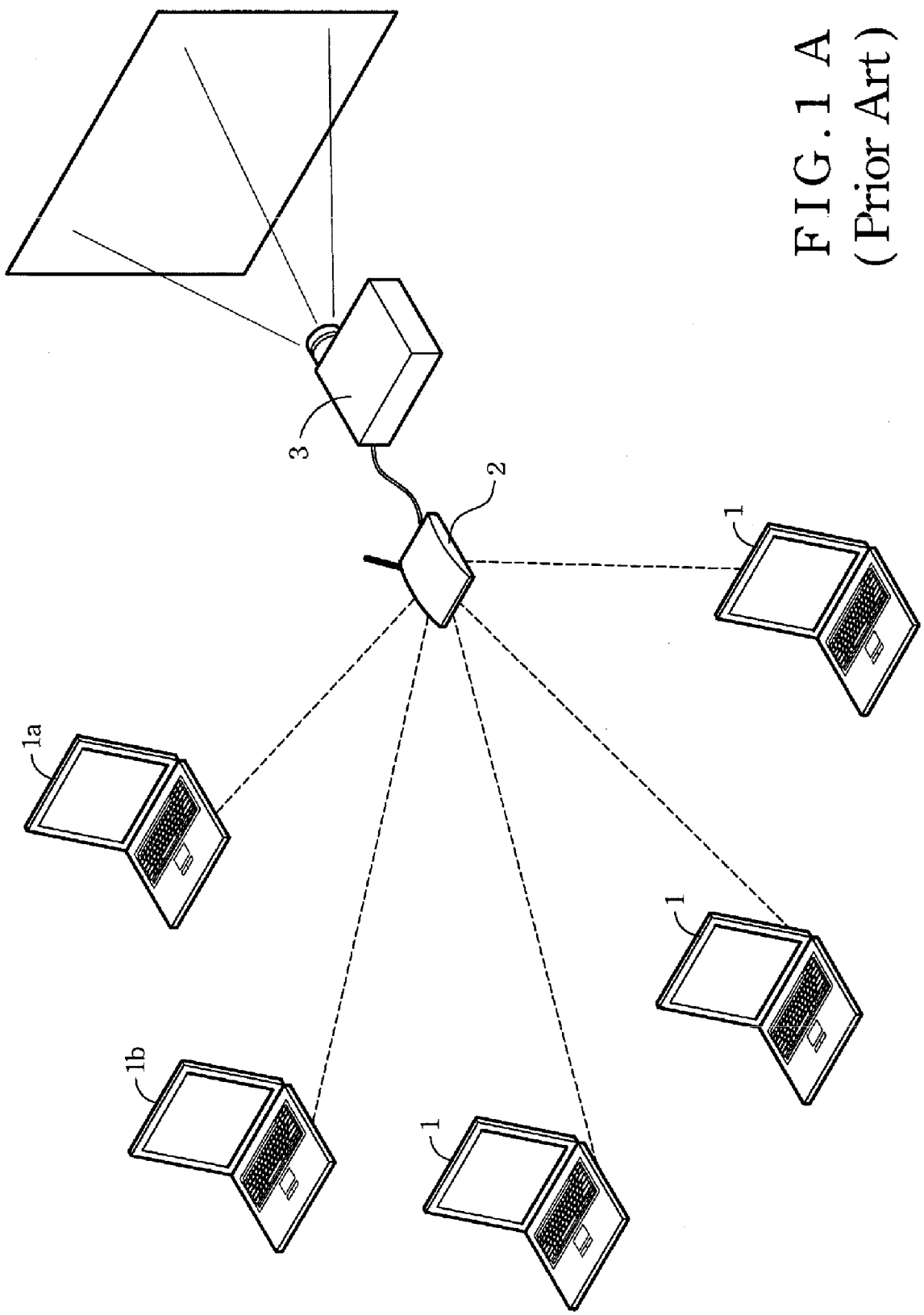
FIG. 1A shows a framework of a conventional multipoint conference.
Figure 1B:
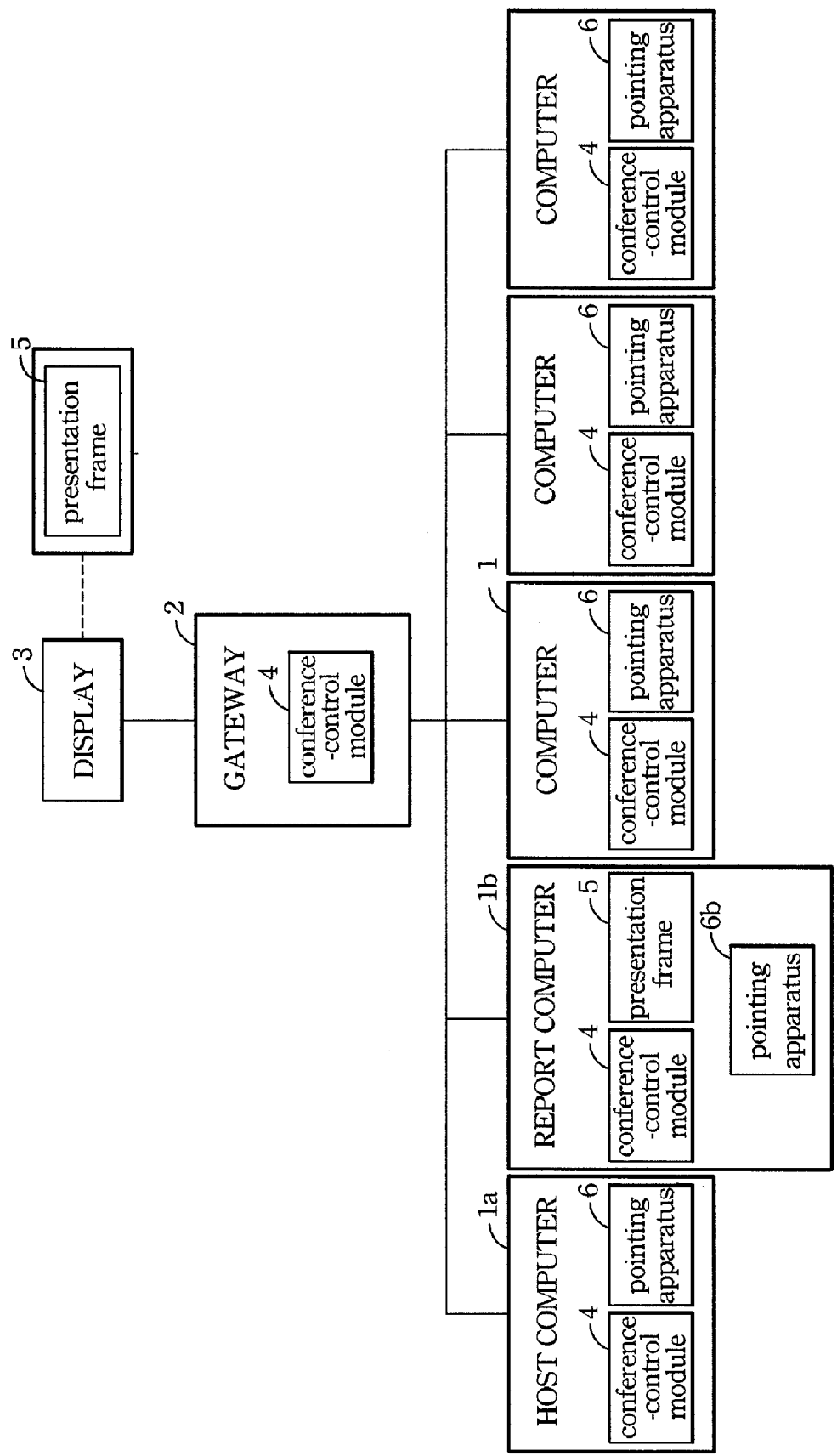
FIG. 1B is a block diagram of a pointing-control system for the multipoint conference of FIG. 1A.
Figure 2:
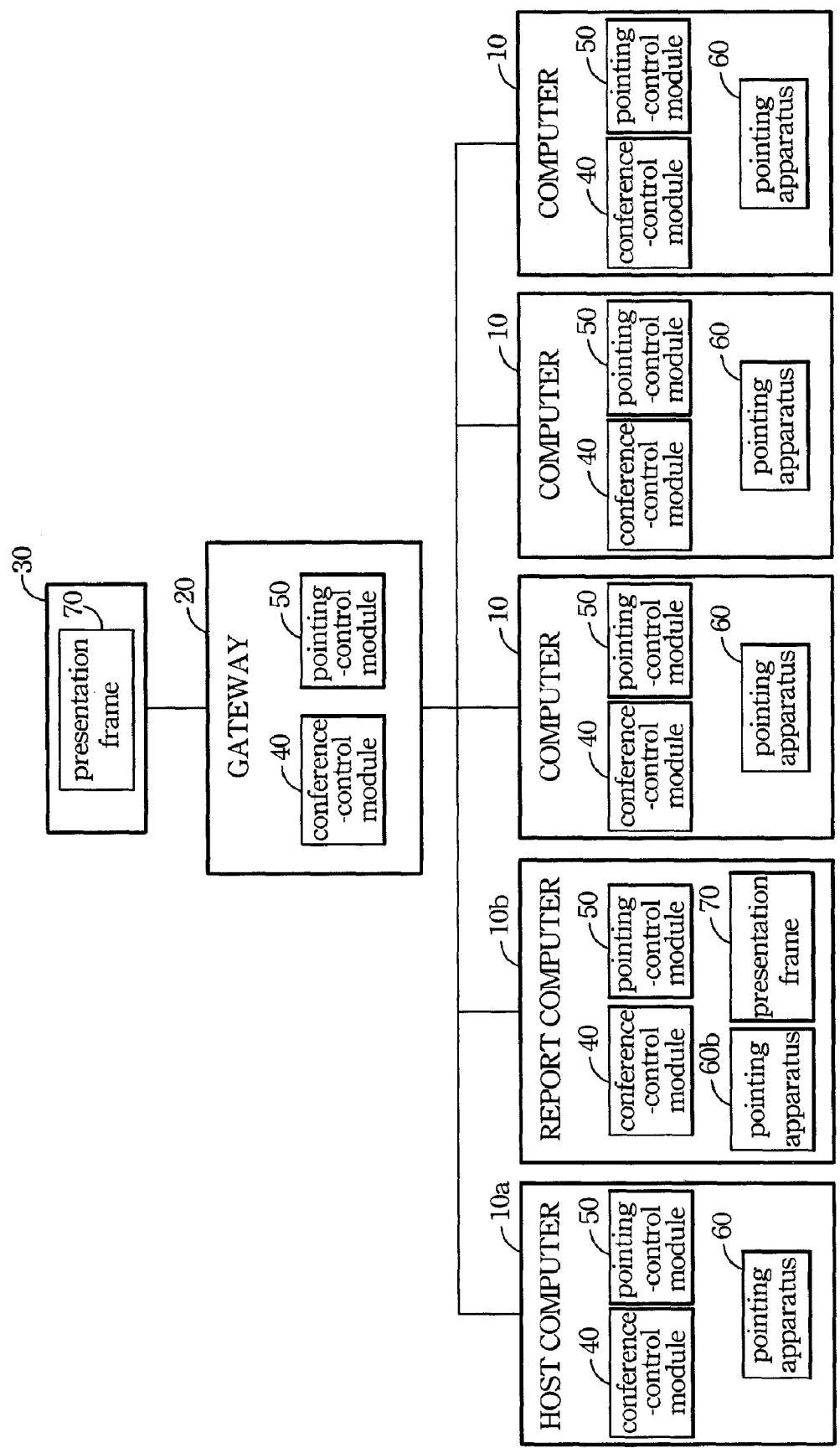
FIG. 2 is a block diagram of a preferred pointing-control system for multipoint conferences in accordance with the present invention.

Referring now to FIG. 2, a block diagram of a preferred pointing-control system for multipoint conferences in accordance with the present invention is shown. The pointing-control system for multipoint conferences comprises a plurality of computers (participants) 10, a gateway 20, a display 30, a conference-control module 40 and a pointing-control module 50. Every of the computers 10 can establish wired or wireless connection to the gateway 20. The display 30 can be a liquid crystal display, a plasma display TV, or a digital projector, any of which has a DVI or a VGA interface. When the display 30 establishes a connection with the gateway 20, the display 30 would display data transmitted from the gateway 20. In the present invention, the conference-control module 40 and the pointing-control module 50 can be respective application programs stored in the gateway 20.

Every of the computers 10 also have a pointing apparatus 60 (a mouse device for example), and the pointing apparatus 60 can generate a respective pointing coordinate (a cursor for example) on the presentation frame shown on the screen of the respective computer 10. When a computer 10 is to join the multipoint conference, the computer 10 needs to establish a network connection with the gateway 20 so as to download the conference-control module 40 from the gateway 20. The conference-control module 40 needs to be executed before the computer 10 can join the multipoint conference. In the case that the computer 10 already has its own conference-control module 40, the computer 10 needs simply to run the conference-control module 40 in advance to join the multipoint conference.

As soon as the connection between the computer 10 and the gateway 20 is established and the computer 10 has executed the conference-control module 40, the computer can then join the multipoint conference. At this time, the conference-control module 40 would define a host computer 10a from the present computers 10 by judging the priority numbers assigned in advance to respective computers 10. Generally, the computer 10 having the highest priority number is defined as the host computer 10a, which has the right to assign any computer 10 to be a report computer 10b. The report computer 10b has a conference-control module 40 and a pointing-control module 50, a pointing apparatus 60b, and a presentation frame 70. The presentation frame 70 of the report computer 10b can be demonstrated on the display 30 through the gateway 20.

In the present invention, the pointing-control module 50 can be stored inside the gateway 20 and can be downloaded to the computer 10 when a network connection is established between the computer 10 and the gateway 20. The pointing-control module 50 and the conference-control module 40 can be integrated as a unique module, or can be two independent modules. The pointing-control module 50 is mainly used to capture the pointing coordinates of the pointing apparatuses 60 of the respective computers 10, and further to display the pointing coordinates on the presentation frame 70 of the display 30 in an on-screen-display (OSD) means.

Figures 3, 4:
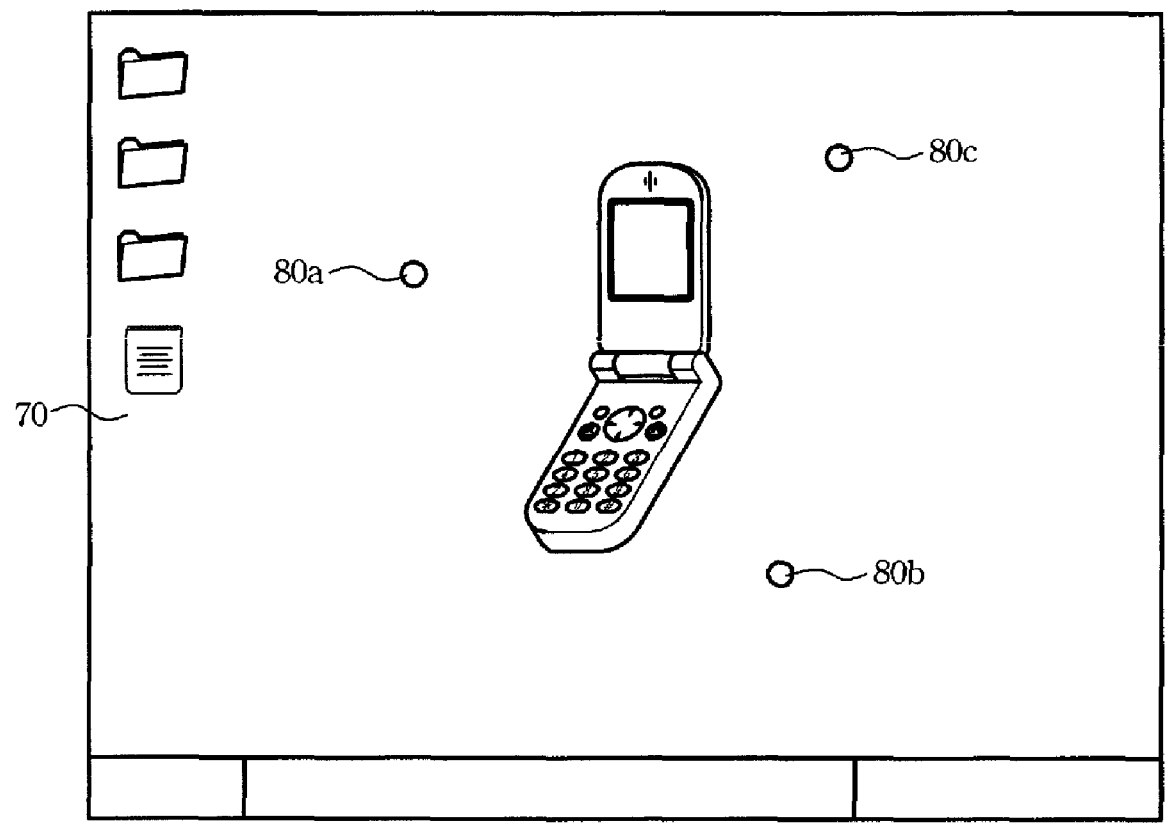
FIG. 3 is a schematic view of a presentation frame of a display showing pointing coordinates of computers in accordance with the present invention.
FIG. 4 is a schematic view of an input interface provided by a pointing-control module in accordance with the present invention.

Referring now to FIG. 3, a schematic view of a presentation frame 70 of a display showing pointing coordinates of computers in accordance with the present invention is illustrated. The presentation frame 70 shown on the display includes the pointing coordinates 80a, 80b, 80c of the respective computers in the multipoint conference. The pointing coordinates 80a, 80b, 80c are shown on the presentation frame 70 of the display in an on-screen-display (OSD) means, so that these pointing coordinates 80a, 80b, 80c are only expressions without further clicking functions on the presentation frame 70. In the present invention, the clicking functions are only assigned to the icons originally shown on the presentation frame 70 and the right to click these icons belongs to the user of the report computer only.

Referring now to FIG. 4, a schematic view of an input interface provided by the pointing-control module in accordance with the present invention is shown. When the computer activates the pointing-control module 50, the pointing-control module 50 would automatically generate an input interface 90 on the screen of the computer for the user to input a user name, a color of the pointing coordinate, a configuration, and a start/terminate command to the pointing-control module 50. In the case that the user starts the pointing-control module 50, the user name, the color of the pointing coordinate and the configuration would be displayed/inserted on the presentation frame 70 shown on the display 30, according to user's instructions. On the other hand, in the case that the user terminates the pointing-control module 50, the pointing coordinate of the user would disappear from the presentation frame 70 on the display 30.

In the present invention, the pointing-control module can further include a resolution-converting module, a sketch mode-switch module and a monitor module, all of which will be described below.

Figure 5A:
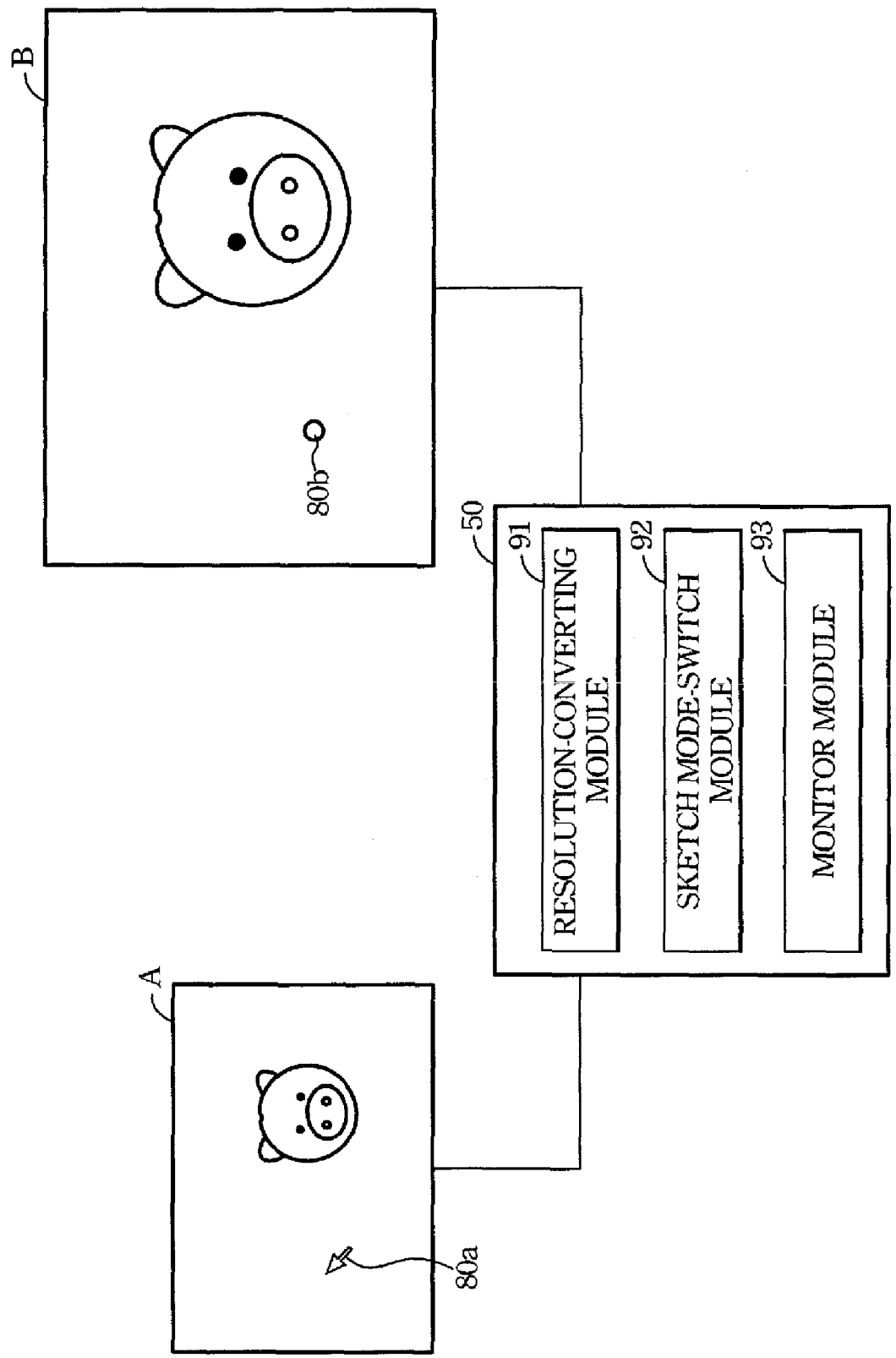
FIG. 5A shows schematically a framework of a resolution-converting module in accordance with the present invention.

Referring now to FIG. 5A, a framework of the resolution-converting module in accordance with the present invention is shown. For different computers (A and B) may have different resolutions, the resolution difference between any two computers needs to be compensated so that the pointing coordinates (80a and 80b) and the presentation frame (the pig heads) can be correctly shown to different screens/displays (A and B) with different resolutions.

Figure 5B:
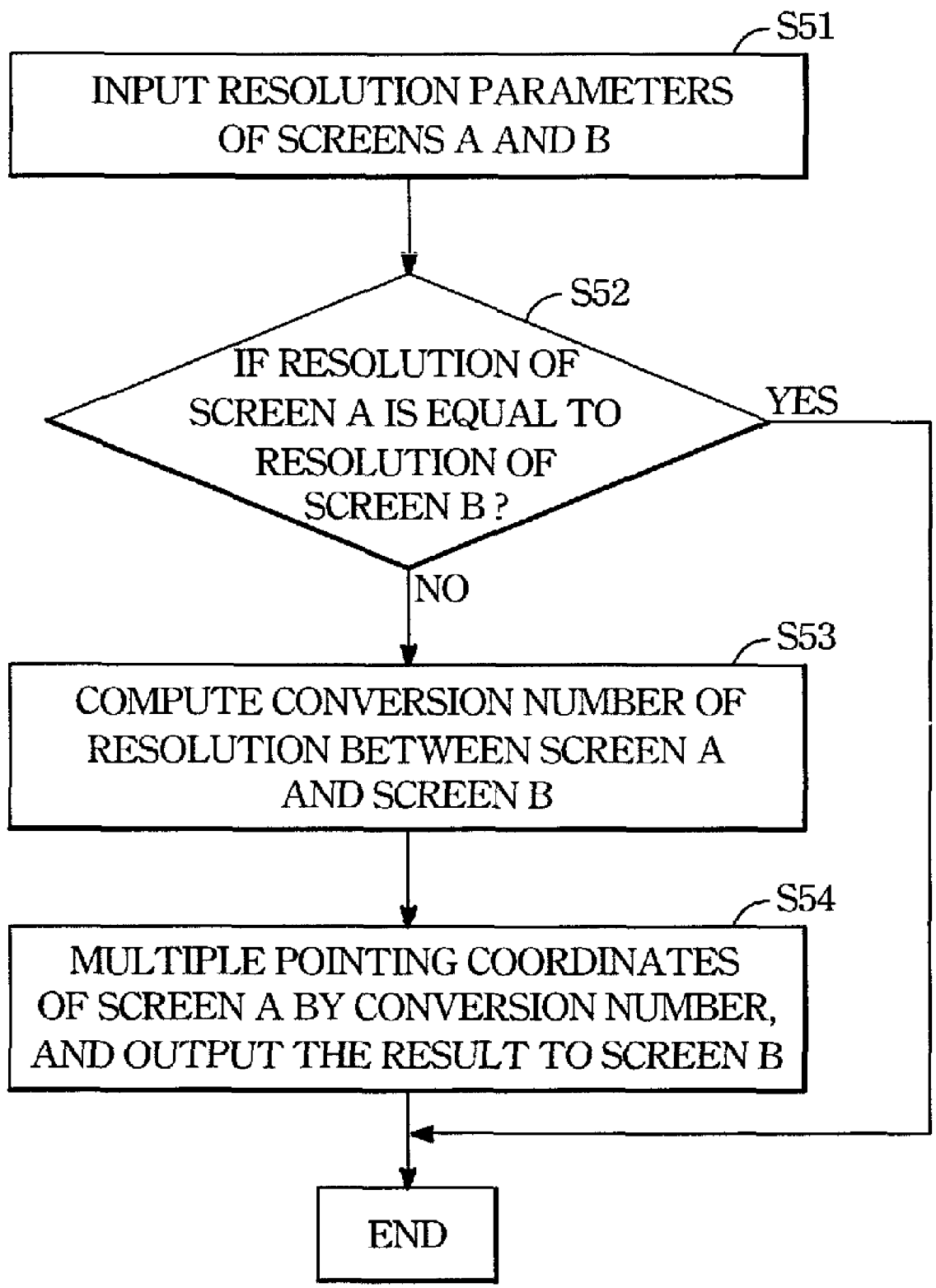
FIG. 5B is a flowchart of operating the resolution-converting module of FIG. 5A.

Referring now to FIG. 5B, a flowchart of operating the resolution-converting module 91 of FIG. 5A is shown. In step S51, the resolution parameters respective to a screen A and a screen B are inputted to the resolution-converting module 91. Then, in step S52, the resolution parameter of the screen A is compared with that of the screen B to determine if any difference in between exists. If the difference does exist, a conversion number of resolution in between is computed in step S53. Finally, in step S54, the pointing coordinate of the screen A is multiplied by the conversion number to obtain a result, and then the result is outputted to the screen B.

Figure 6:
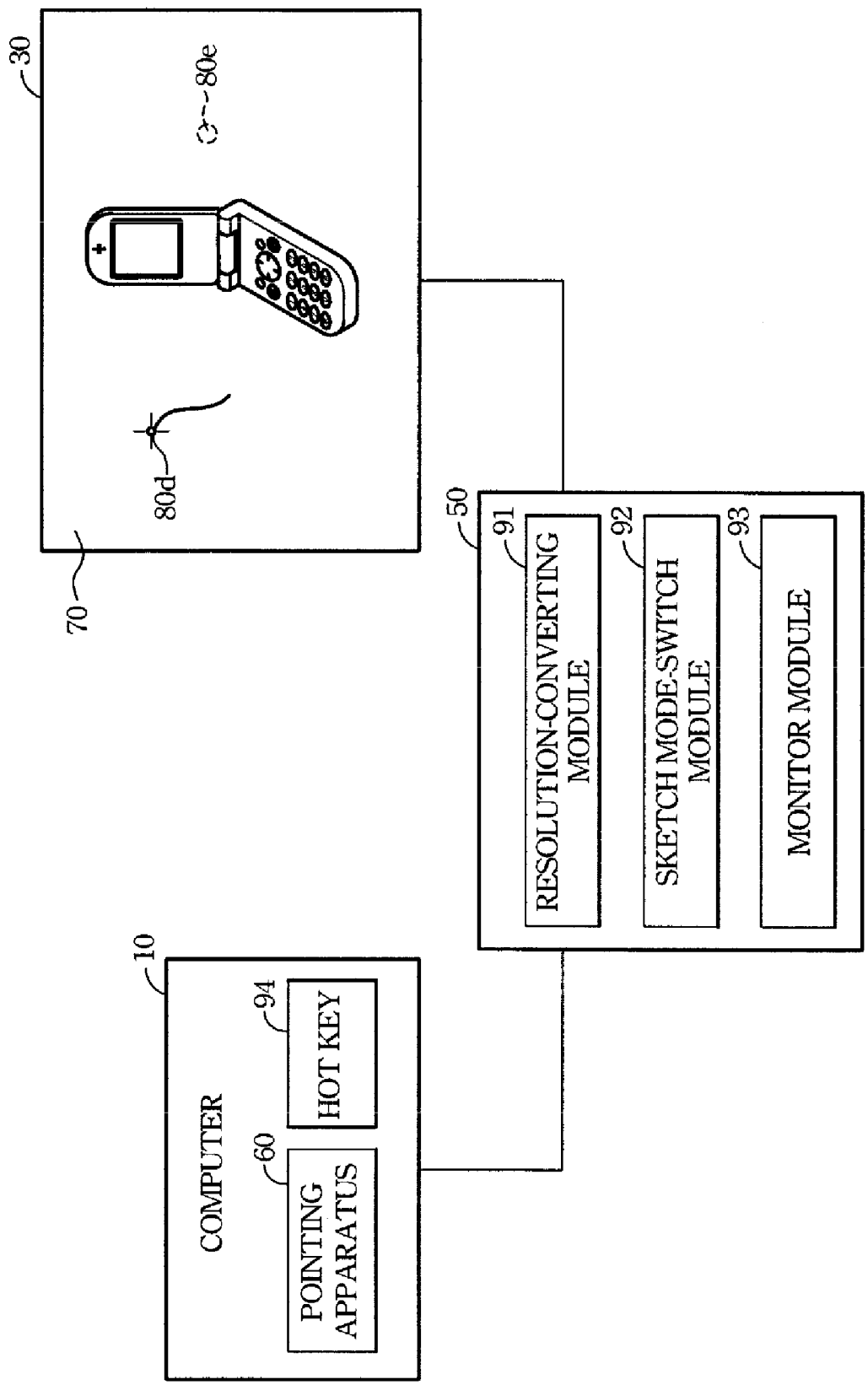
FIG. 6 shows schematically a framework of a sketch mode-switch module and a monitor module in accordance with the present invention.

Referring now to FIG. 6, a framework of the sketch mode-switch module 92 and the monitor module 93 in accordance with the present invention is shown. The sketch mode-switch module 92 is switched through a hot key 94 of the computer 10. When a sketch mode is activated, the sketch mode-switch module 92 would display tracks of the pointing coordinate 80d of the computer 10 to the presentation frame 70 of the display 30. On the other hand, when the sketch mode is terminated, the sketch function of the pointing apparatus on the presentation frame 70 of the display 30 would be disabled. By providing this sketch function, the opinion of the participant in the multipoint conference and the object in discussion on the screen would be much clearly to be understood by all the participants.

Also, in FIG. 6, the pointing-control module 50 can further include the monitor module 93 for monitoring states of the pointing apparatuses 60 of the computers 10. In the case that any of the pointing apparatuses 60 is idle for a predetermined time, the monitor module 93 would suspend the idle pointing apparatus 60 in transmitting the pointing coordinate 80e to the presentation frame 70 of the display 30, till the idle pointing apparatus 60 is reactivated.

While the present invention has been particularly shown and described with reference to a preferred embodiment, it will be understood by those skilled in the art that various changes in form and detail may be without departing from the spirit and scope of the present invention.

I claim:

1. A pointing-control system for multipoint conferences, comprising:
    a plurality of computers, including a report computer, each of the computers having a respective pointing apparatus, the pointing apparatus of each computer showing a respective pointing coordinate on a screen of the computer having the pointing apparatus;
    a gateway, connected with the plurality of computers through a network;
    a display, connected with the gateway;
    a conference-control module for forwarding a presentation frame on the screen of the report computer to the display through the gateway;
    a pointing-control module for capturing all the pointing coordinates of the pointing apparatuses of each respective computer of the plurality of computers through the gateway and for forwarding the pointing coordinates to the presentation frame of the display; and
    said pointing-control module is stored in said gateway and is downloaded to any of said plurality of computers as soon as said any of the said plurality of computers is connected with said gateway through said network.

2. The pointing-control system according to claim 1, wherein each pointing coordinate is displayed on said presentation frame of said display in an on-screen-display (OSD) means.

3. The pointing-control system according to claim 1, wherein each pointing apparatus is a mouse device.

4. The pointing-control system according to claim 1, wherein said pointing-control module further includes a resolution-converting module for compensating a resolution difference between said screens of said plurality of computers and a screen of said display so as to have said respective pointing coordinate of each of said pointing apparatus of each of said plurality of computers displayed on said presentation frame of said display correctly.

5. The pointing-control system according to claim 1, wherein said pointing-control module further includes a sketch mode-switch module, said pointing-control module displaying tracks of each pointing apparatus of each respective computer to said presentation frame of said display when a sketch mode is activated by the sketch mode-switch module.

6. The pointing-control system according to claim 5, wherein each computer includes a hot key for accessing said sketch mode-switch module.

7. The pointing-control system according to claim 1, wherein said display further includes a transmission interface selected from a group of a VGA and a DVI to establish data transmission in between with said gateway.

8. The pointing-control system according to claim 1, wherein said pointing-control module further include a monitor module for monitoring states of the pointing apparatuses; in the case that any of said pointing apparatuses is idle for a predetermined time, the monitor module suspending said any of said pointing apparatuses that are idle as an idle pointing apparatus in transmitting said pointing coordinate of said idle pointing apparatus to said presentation frame of said display till the idle pointing apparatus is reactivated.

9. The pointing-control system according to claim 1, wherein each of said computers is assigned by a predetermined priority number, a computer having the highest priority number being defined as a host computer capable of assigning any of said computers as said a report computer and further controlling said conference-control module to transmit said presentation frame of said report computer to said gateway.

* * * * *